United States Patent
Gotoh et al.

(10) Patent No.: US 8,033,314 B2
(45) Date of Patent: Oct. 11, 2011

(54) METHOD FOR PRODUCING SINTERED MAGNET

(75) Inventors: Masashi Gotoh, Nikaho (JP); Yoshihiko Minachi, Makinohara (JP); Yoshihiro Enda, Nikaho (JP); Shunichi Kudo, Akita (JP); Tomohiko Aida, Nikaho (JP)

(73) Assignee: TDK Corporation, Tokyo (JP)

( * ) Notice: Subject to any disclaimer, the term of this patent is extended or adjusted under 35 U.S.C. 154(b) by 432 days.

(21) Appl. No.: 12/382,985

(22) Filed: Mar. 27, 2009

(65) Prior Publication Data

US 2009/0242164 A1 Oct. 1, 2009

(30) Foreign Application Priority Data

Mar. 31, 2008 (JP) ................................ 2008-093849

(51) Int. Cl.
*B22D 27/09* (2006.01)
*C04B 35/00* (2006.01)
(52) U.S. Cl. .................... 164/113; 419/41; 252/62.51 R
(58) Field of Classification Search .................. 164/113; 419/26, 41, 67; 264/427–429, 478, 612, 264/645; 252/62.51 R–62.51 C
See application file for complete search history.

(56) References Cited

U.S. PATENT DOCUMENTS

| | | | | |
|---|---|---|---|---|
| 5,427,734 A | * | 6/1995 | Yamashita et al. ............... | 419/23 |
| 6,063,322 A | * | 5/2000 | Draxler et al. ................. | 264/428 |
| 6,402,980 B1 | * | 6/2002 | Taguchi et al. ............ | 252/62.63 |
| 6,908,568 B2 | * | 6/2005 | Masuzawa et al. ......... | 252/62.56 |
| 2006/0172151 A1 | | 8/2006 | Minachi et al. | |

FOREIGN PATENT DOCUMENTS

| | | |
|---|---|---|
| JP | A-62-41759 | 2/1987 |
| JP | A-10-506089 | 6/1998 |
| JP | A-2001-181057 | 7/2001 |
| JP | B2-3229435 | 9/2001 |
| JP | A-2004-296849 | 10/2004 |
| JP | B2-3833861 | 7/2006 |
| JP | 2008-270792 A | 11/2008 |
| KR | 10-2005-0071678 | 7/2005 |

OTHER PUBLICATIONS

Office Action dated Apr. 13, 2010 issued in Japanese Patent Application No. 2008-093849 (with translation).

\* cited by examiner

*Primary Examiner* — Jessica L Ward
*Assistant Examiner* — Kevin E Yoon
(74) *Attorney, Agent, or Firm* — Oliff & Berridge, PLC

(57) ABSTRACT

A method for producing a sintered magnet comprising steps of; wet-pulverizing a magnetic powder under the presence of a surface active agent, drying said wet-pulverized magnetic powder 20 for obtaining magnetic powder to which said surface active agent is adhered, heating and kneading said dried magnetic powder 20 with binder resin to form pellet, melting said pellet and injecting said pellet in a mold to which magnetic field is applied, to form a preform body, and firing said preform body.

10 Claims, 3 Drawing Sheets

(A)

(B)

METHOD FOR PRODUCING SINTERED MAGNET

BACKGROUND OF THE INVENTION

1. Field of the Invention

The present invention relates to a method for producing a sintered magnet, more particularly, it relates to a method for producing the sintered magnet having excellent magnetic properties which is available to be produced in a high productivity.

2. Description of the Related Art

As a method for producing a sintered magnet, a dry forming method (for example, JP Patent Laid Open No. 2004-296849) and a wet forming method (for example, JP Patent No. 3833861) are known. In the dry forming method, a preform body is formed by pressure forming the dried magnetic powder and applying the magnetic field, then, firing the preform body. In the wet forming method, a liquid component is removed by pressure forming the slurry which includes the magnetic powder while applying a magnetic filed to form the preform body, then firing the preform body.

In the wet forming method, there is an advantageous point that required time for forming step is short since the dried powder is pressure formed in a mold, however it is difficult to improve the orientation ratio of the magnetic powder due to the magnetic field at the time of forming. As a result, the magnetic property of the obtained sintered magnet is lower than the sintered magnet obtained by the wet forming method. Further, in the wet forming method, the magnetic powder tends to be oriented easily by the magnetic field at the time of forming thus the magnetic property of the sintered magnet is excellent, however there is a problem that it takes a long time for forming, because the pressure is applied together with the removal of the liquid component.

Note that, as shown in JP Patent No. 3229435, it is proposed that a method for forming the kneaded pellet including the magnetic powder and the binder resin by injecting into the mold wherein the magnetic field is applied. However, by such method in which it is injection molded in a mold wherein the magnetic field is applied, when forming the kneaded pellet, the magnetic powder with a fine particle size tends to disperse non-uniformly due to the aggregation of the magnetic powder of the fine particle size particularly, there is a problem that the magnetic orientation of the magnetic powder cannot be made well in subsequent injection molding.

The present invention is made by considering these circumstances, and a purpose of the invention is to provide a method for producing the sintered magnet which is available to produce the sintered magnet with a high magnetic property with a high productivity.

SUMMARY OF THE INVENTION

In order to achieve the above purpose, a method for producing a sintered magnet according to the present invention comprises steps of;

wet-pulverizing a magnetic powder under the presence of a surface active agent, drying said wet-pulverized magnetic powder for obtaining a magnetic powder to which said surface active agent is adhered, heating and kneading said dried magnetic powder with a binder resin to form a pellet, melting said pellet and obtaining a preform body by injection molding within a mold applied with a magnetic field, and firing said preform body.

Said surface active agent may be added directly to the magnetic powder prior to wet-pulverizing or it may be added to a slurry for performing the wet-pulverizing.

In the method of the present invention, the binder resin enters between particles of the magnetic powder for sure, since the surface active agent intervenes between the particles of the magnetic powder and the binder resin. As a result, the dispersion status of the magnetic powder is kept excellent even when the magnetic powder is pelletized by the heat kneading with the binder resin, thus the magnetic powder disperse uniformly and flows in the mold of the injection molding corresponding to the magnetic field so as to perform the excellent magnetic field orientation. Therefore, the orientation degree of the finally obtained sintered magnet is improved.

Also, in the method of the present invention, because it becomes preform body with a status in which the binder resin intervenes between the magnetic powder particles, thus the preform body having uniformly dispersed magnetic powder can be obtained, and the magnetic property of the sintered magnet obtained by firing the preform body becomes uniform.

Further, in the method of the present invention, when injection molding, the magnetic powder can be transferred into a mold while preventing the aggregation between the magnetic powder particles as well as preventing the adhesion of the particles to the contact face of the transferring pathway by using the dissolved binder resin as a transferring medium.

In addition, it is not necessary to remove the transferring medium at the orientation of the magnetic powder because of the magnetic field in the mold. Therefore, in the method of the present invention, the magnetic powder can be filled uniformly into a narrow cavity, as well as a time required for one-shot is short, thus has an excellent productivity. Additionally, in the method of the present invention, a clogging of the pathway for removing the transferring medium does not occur and problems such as degassing does not occur. As a result of this, the sintered magnet which is comparatively a thin type can be produced at a high productivity.

Incidentally, in a conventional wet method, it requires to remove a solvent as transferring medium at the time of pressure treatment of the magnetic powder at a specific magnetic field, and it was not easy to remove the solvent smoothly. Therefore, cracks tend to occur to a formed body as well as a time required for one-shot is long, thus had a significant disadvantage of extremely low productivity.

Also, in the conventional dry method, it requires to degas the air and nitrogen as the transferring medium at the time of pressure treatment of the magnetic powder in a specific magnetic field, thereby, the treatment is complicated, and since the dried magnetic powder is pressure formed in the mold, the magnetic powder particles tend to be pressure formed while being aggregated. Therefore, even when the magnetic field is applied to the mold, it tends to be formed while the direction of easy axis of the magnetization of particles is discrete due to the friction between the aggregated magnetic powder or the bonding force between the particle.

In the present invention, preferably, said magnetic powder is ferrite powder, and an average particle diameter of said magnetic powder after drying is within a range of 0.03 to 0.7 μm. In the method of the present invention, even if the average particle diameter of the ferrite powder is 0.7 μm or less, it is possible to suppress the aggregation of the ferrite powder prior to the forming, and it is possible to perform magnetic field forming while the status of the ferrite powder is uniformly dispersed in the cavity of the mold. Therefore, it is available to produce a ferrite magnet having high magnetic property.

As said surface active agent, it is not particularly limited, however it preferably includes polyhydric alcohols shown by a general formula of $C_n(OH)_nH_{n+2}$, and more preferably it includes at least one of sorbitol or mannitol. By using these surface active agents, effects of the present invention are improved.

Preferably, 0.05 to 5 parts by weight of said surface active agent is included with respect to 100 parts by weight of said magnetic powder. By including the surface active agent within the range, effects of the present invention are improved.

In case there is a plurality of steps of wet-pulverizing said magnetic powder, said magnetic powder may be wet-pulverized under the presence of said surface active agent, at the final wet-pulverizing step. The obtained magnetic powder as the final results of pulverizing step, is dispersed in the solvent for wet-pulverizing, thus the solvent intervening between the particles introduce the surface active agent between the magnetic particles by loosening the aggregation of the powder particle. Therefore, even if the magnetic powder after drying re-aggregates, the surface active agent is introduced between the magnetic powder particles. As a result, the re-aggregated granulate (the aggregation of the magnetic powder particles) contributes to the degradation to the magnetic powder particles in later steps (kneading/forming), and it is thought to improve the orientation degree.

Further preferably, the method of the present invention comprises a step for dry rough pulverizing of said magnetic powder prior to the step of wet-pulverizing without adding surface active agent at the wet-pulverizing, and said surface active agent is added in the dry rough pulverizing step.

In case of performing the dry rough pulverizing prior to the wet-pulverizing, if the surface active agent is added at the time of dry rough pulverizing, then the wet-pulverizing can be started from a condition that the surface active agent being adhered to the roughly pulverized particle surfaces. Therefore, the surface active agent tends to easily intervene between the magnetic particles evenly, and the orientation degree can be improved.

BRIEF DESCRIPTION OF THE DRAWINGS

Below, the present invention will be explained based on embodiments shown in drawings.

DESCRIPTION OF THE PREFERRED EMBODIMENTS

Figure 1:
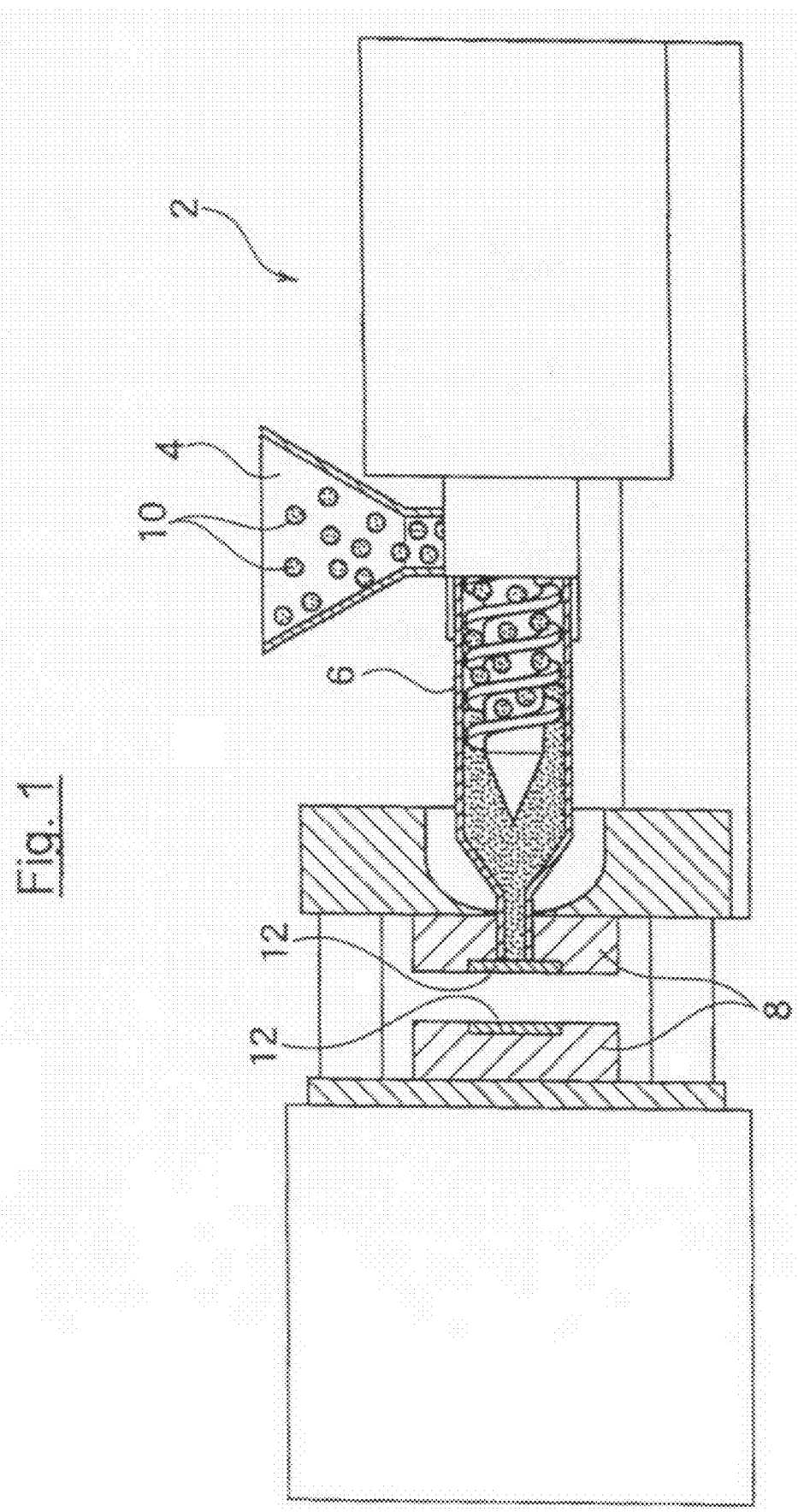
FIG. 1 is across sectional view of a main section of a magnetic field injection molding machine used for a method for producing sintered magnet according to one embodiment of the present invention.

First, a magnetic field injection molding machine 2 shown in FIG. 1 will be specified. As shown in FIG. 1, the magnetic field injection molding machine 2 comprises an extruder 6 having a hopper 4 to which pellets 10 are loaded, and a mold 8 to form a molten material of the pellets 10 extruded from the extruder 6 in a cavity 12. The magnetic field injection molding machine is a molding machine using CIM (ceramic injection molding) molding.

In a method for producing sintered magnet according to the present invention, firstly, a raw material powder of the magnetic powder is prepared. Although the raw material powder of the magnetic powder is not particularly limited, preferably, ferrite is used. In particular, hexagonal system of ferrite, such as M phase, W phase of magnetoplumbite and the like are preferably used.

As such ferrite, particularly, $MO.nFe_2O_3$ (M is preferably more than one kind of Sr and Ba, n=4.5 to 6.5) is preferable. Further, rare earth element, Ca, Pb, Si, Al, Ga, Sn, Zn, In, Co, Ni, Ti, Cr, Mn, Cu, Ge, Nb, Zr and the like may be included in such ferrite like this.

In particular, the ferrite comprising hexagonal magnetoplumbite (M type) ferrite including A, R, Fe and M shown in the following as constituting elements in a main phase is preferable. However, A is at least one kind of element selected from Sr, Ba, Ca and Pb; R is at least one kind of element selected from rare earth element (including Y) and Bi; M is Co and/or Zn. A constituting ratio of total sum of each respective metal elements A, R, Fe and M with respect to whole metal elements amount is, A: 1 to 13 atom %,
R: 0.05 to 10 atom %,
Fe: 80 to 95 atom %,
M: 0.1 to 5 atom %.

In this ferrite, a composition formula of ferrite assuming that R exists at A site, and M exists at Fe site may be shown by a formula 1 below. Note that, x, y, z are values calculated from the above amount.

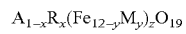

$$A_{1-x}R_x(Fe_{12-y}M_y)_zO_{19} \qquad \text{formula 1}$$

For producing a raw material powder of such anisotropic ferrite, oxide of the raw material of the ferrite composition or the compound which becomes oxide by firing is blended prior to the calcine, and then it is calcined. The calcine may be performed, in atmosphere, for example, at 1000 to 1350° C., for 1 second to 10 hours; in particular, when obtaining fine calcined powder of Sr ferrite of M type, it may be performed at 1000 to 1200° C., for 1 second to 3 hours.

Such calcined powder is substantially composed of granular particles having the ferrite composition of magnetoplumbite type, an average particle size of one dimensional particle thereof is 0.1 to 1 μm, in particular, 0.1 to 0.5 μm is preferable. The average particle diameter may be measured by a scanning electron microscope (SEM), its coefficient variance CV is 80% or less, and 10 to 70% is preferable in general. Also, saturated magnetization as is 65 to 80 emu/g, in particular, M type Sr ferrite is 65 to 71.5 emu/g, coercitivity HcJ is 2000 to 8000 Oe, in particular, M type Sr ferrite is 4000 to 8000 Oe is preferable.

In the present embodiment, the calcined powder produced in such way is dry rough pulverized according to the needs, and wet-pulverizing are performed once or more.

In a step of the dry rough pulverizing, normally, it is pulverized until BET specific surface area becomes 2 to 10 times or so. It is preferable that an average particle diameter after pulverizing is 0.1 to 1 μm or so, the BET specific surface area is 4 to 10 m²/g, CV of the particle diameter is 80% or less, particularly it is preferably kept at 10 to 70%. The pulverizing means is not particularly limited, for example, a dry oscillation mill, a dry attritor (media agitator mill), dry ball mill and the like may be used, and however in particular, it is preferable to use the dry oscillation mill. The pulverizing time may be suitably determined in response to the grinding means.

The dry rough pulverizing has an effect to make the coercitivity HcB smaller by introducing a crystal distortion to the calcined particles. By lowering the coercitivity, the aggregation of the particles is suppressed and dispersion property improves. Further, the orientation degree can be improved. The crystal distortion introduced to the particles is released in a following sintering process, and thereby returns to an original hard magnetism and becomes permanent magnet.

After the dry rough pulverizing, slurry for the pulverizing which includes the calcined particles and water is prepared, and the wet-pulverizing using thereof is performed. The content of the calcined particles in the slurry for the pulverizing is preferably 10 to 70 wt %. Although means for the pulverizing used for the wet-pulverizing is not particularly limited, normally, preferably ball mill, an attritor, an oscillation mill and the like may be used. The pulverizing time may be determined according to the pulverizing means.

In the present embodiment, at the wet-pulverizing, the surface active agent is added. As the surface active agent, preferably, polyhydric alcohol shown by a general formula $C_n(OH)_nH_{n+2}$ is used. The polyhydric alcohol are those with 4 or more carbon numbers n, preferably 4 to 100, more preferably 4 to 30, further preferably 4 to 20, and most preferably 4 to 12.

The above mentioned general formula of the polyhydric alcohol is a formula in case the frame is all chain and no unsaturated bond is included. Hydroxyl group number and hydrogen number in the polyhydric alcohol may be slightly fewer than numbers shown by the generic formula. Although the above polyhydric alcohol may be saturated or it may include unsaturated bond and a basic frame may be chain or cyclic, however the chain is preferable. Also, when the hydroxyl group number is 50% or more of the carbon number n, the effects of the present invention can be realized, however the more the hydroxyl group number is the more preferable it is, and most preferably that the hydroxyl group number and the carbon number matches.

As the surface active agent used in the present invention, specifically, sorbitol, mannitol in which n=6 is preferable. With respect to the above mentioned preferable surface active agent, the constitution thereof is shown below.

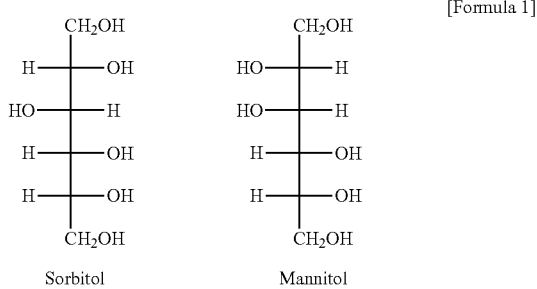

[Formula 1]

Sorbitol    Mannitol

There is a possibility that the structure of the surface active agent used in the present invention changes by the mechanochemical reaction due to the pulverizing. Further, there is a possibility to achieve the purpose of the present invention, for example, by adding the compound which generates organic compounds identical to the surface active agent used in the present embodiment, such as ester and the like, due to hydrolysis reaction or so. Note that, two or more kinds of surface active agents may be used together. The surface active agents used together at this time are not limited with in a range of the present invention.

The added amount of the surface active agent is preferably 0.03 parts by weight to 5 parts by weight, more preferably 0.03 to 3.0 parts by weight with respect to 100 parts by weight of the magnetic powder. If the added amount of the surface active agent is too little, the improvement of the orientation degree becomes insufficient; on the other hand, if the surface active agent is too much, the cracks tend to occur to the formed body and sintered body.

The adding time of the surface active agent is not particularly limited, and it may added at the time of the dry rough pulverizing, at the time of preparing the pulverizing slurry at the wet-pulverizing, or part of it may be added at the time of dry rough pulverizing and remaining portion may be added at the time of the wet-pulverizing. Alternatively, it may be added by stirring after the wet-pulverizing. In any cases, since the surface active agent exists in following mentioned pellets, the effects of the present invention can be realized.

However, in particular, in case of performing the dry rough pulverizing prior to the wet-pulverizing, it is preferable to add the surface active agent at a step of the dry rough pulverizing not at the wet-pulverizing. In case of performing the dry rough pulverizing prior to the wet-pulverizing, if the surface active agent is added at the time of the dry rough pulverizing, the wet-pulverizing may be started at a condition that the surface active agent is adhered to the roughly pulverized particle surfaces. Therefore, the surface active agent tends to equally intervene between the magnetic particle at the wet-pulverizing, and the orientation degree can be improved.

Note that, in case the surface active agent is added by dividing in several times, each added amount may be set so that the above mentioned total added amount is within a preferable range, preferably, the surface active agent is added at the final wet-pulverizing of the plurality of time. By dispersing the magnetic powder obtained as the final results of the pulverizing steps in the solvent for the wet-pulverizing, the powder particle aggregation loosens and the solvent which intervenes between the particles introduces the surface active agent in between the magnetic particles. Therefore, even if the magnetic powder after drying reaggregates, the surface active agent is sandwiched between the magnetic powder particles. As a result, the reaggregated granulate (the aggregation of the magnetic powder particles) contributes to the degradation into the magnetic powder particles in later steps (kneading/forming), and it is thought to improve the orientation.

The magnetic powder is dried after the wet-pulverizing. The drying temperature is preferably 80 to 150° C., more preferably 100 to 120° C. Also, the drying time is preferably 60 to 600 minutes, further preferably 300 to 600 minutes.

The average particle diameter of the magnetic powder particle after drying is preferably within a range of 0.03 to 0.7 μm, further preferably, within a range of 0.1 to 0.5 μm. The surface active agent is adhered to the magnetic powder after drying. This adhesion of the surface active agent to the magnetic powder after drying is confirmed by thermogravimetry/differential thermogravimetric analysis (TG-DTA).

The magnetic powder after drying is kneaded with the binder resin, waxes, lubricant, plasticizer, sublimable compounds and the like, to form pellets by a pelletizer and the like. The kneading is conducted by, for example, a kneader and the like. As the pelletizer, for example, twin axis extruder is used.

As the binder resin, a high molecular compound such as thermal plastic resin is used; and as the high thermal plastic resin, for example, polyethylene, polypropylene, ethylene-vinyl acetate copolymer, atactic polypropylene, acrylic polymer, polystyrene, polyacetal and the like are used.

As the waxes, other than natural waxes such as a carnauba wax, montan wax, beeswax and the like; synthetic waxes such as paraffin wax, urethanated wax, polyethylene glycol and the like are used.

As the lubricant, for example, fatty acid ester and the like are used; and as the plasticizer, phthalate ester is used.

The added amount of the binder resin is preferably 5 to 20 parts by weight with respect to 100 parts by weight of the magnetic powder, the added amount of the waxes is preferably 5 to 20 parts by weight, the added amount of the lubricant is preferably 0.1 to 5 parts by weight. The added amount of the plasticizer is preferably 0.1 to 5 parts by weight with respect to 100 parts by weight of the binder resin.

The pellet of the present embodiment which includes at least the magnetic powder and the binder resin is cut, and when SEM picture of a cutting surface thereof is observed, it is confirmed that the magnetic powder is dispersed uniformly in a matrix of the binder resin.

In the present embodiment, such pellets 10 are injection molded into the mold 8 by using the magnetic field injection molding apparatus 2 shown in FIG. 1. Prior to the injection to the mold 8, the mold 8 is closed to form the cavity 12, and the magnetic field is applied to the mold 8. Note that, the pellets 10 are heated and melted in the extruder 6, for example at 160 to 230° C., and injected into the cavity 12 by a screw. The temperature of the mold 8 is 20 to 80° C. The applied magnetic field to the mold 8 is 5 to 15 kOe.

The preform body after the magnet field injection molding step is heat treated at temperature of 300 to 600° C. in atmosphere or nitrogen to perform debinding treatment. Next, in a sintering step, a formed body is sintered for example, in atmosphere, preferably at a temperature of 1100 to 1250° C., more preferably 1160 to 1220° C. for 0.2 to 3 hours or so to obtain an isotropic ferrite magnet.

Note that, the sintered magnetic may be obtained by crushing the formed body produced by the method of the present invention using a crusher and the like, and classifying by a mesh sieve and the like so that the average particle diameter becomes 100 to 700 μm to obtain a magnetic field orientation granulate, and then by sintering after the dry magnetic field forming the magnetic field orientation granulate the sintered magnet is obtained.

By the method for producing the sintered magnet according to the present invention, the binder resin enters between the particles of the magnetic powder for sure by the surface active agent which intervenes between the particles of the magnetic powder and the binder resin. As a result, the dispersed state of the magnetic powder is kept excellent, even though the magnetic powder is pelletized by heat kneading with the binder resin.

Figure 2:
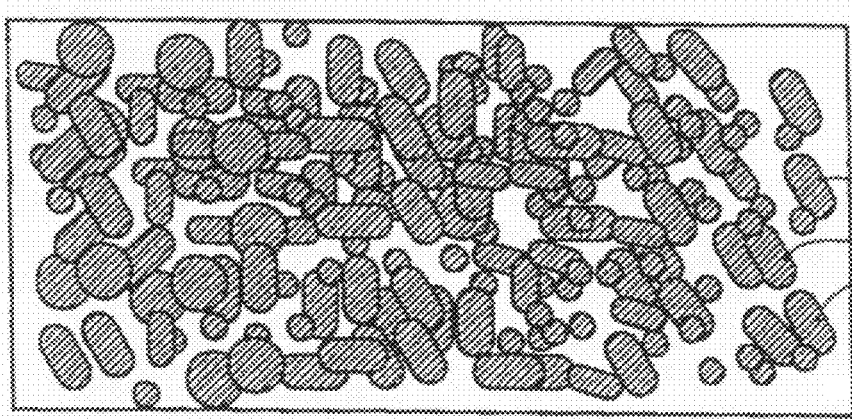
FIG. 2(A) is a schematic view showing magnetic powder prior to magnetic field injection molding.
FIG. 2(B) is a schematic view showing orientation of magnetic powder after magnetic field injection molding.
Figure 2:
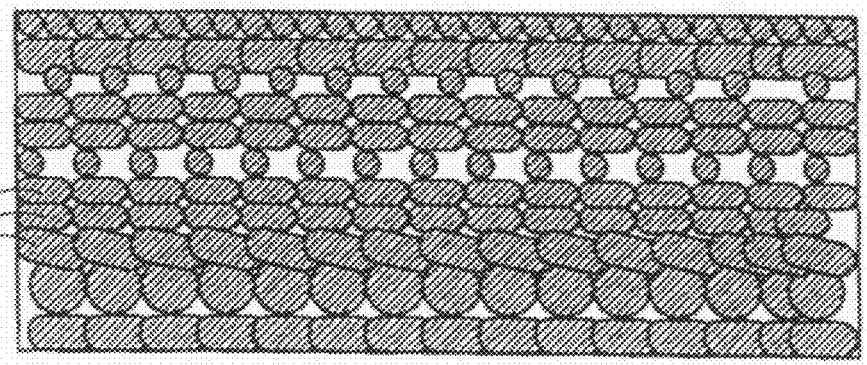

When performing the magnetic field injection molding by using such pellets, as shown in FIG. 2(A) to FIG. 2(B), the magnetic powder 20 disperses uniformly and flows within the mold corresponding to the magnetic field, and the magnetic field orientation along with the magnetic field direction X is performed well. Namely, by the method of the present embodiment, different from the wet-pulverizing method, there is no pressure which acts to disturb the magnetic field, therefore the orientation is improved.

Therefore, the orientation of the sintered magnet obtained at the end improves. Note that, the orientation degree of the magnet is a ratio (Ir/Is) of a residual magnetization (Ir) against a saturated magnetization (Is). The orientation degree of the magnet is proportional to the magnetic orientation degree of the magnetic powder 20 in a preform body after the magnetic field injection molding shown in FIG. 2(B).

Also, in the method of the present embodiment, because the binder resin becomes the preform body while intervening between the magnetic powder particles, thus the preform body having uniformly dispersed magnetic powder 20 can be obtained, and the magnetic property of the sintered magnet obtained by firing the preform body becomes uniform.

Further, in the method of the present embodiment, the magnetic powder can be transferred to the inside of the mold while preventing the aggregation between the magnetic powder particles as well as preventing the adhesion of the particles to the contact face of transferring pathway by using the melting binder resin as the transferring medium at the injection molding.

In addition, it is not necessary to remove the transferring medium when orientating the magnetic powder by the magnetic field in the mold 8 shown in FIG. 1. Therefore, in the method of the present embodiment, the magnetic powder can be filled uniformly into a narrow cavity 12, as well as the time required for one-shot is short and productivity is excellent. Additionally, in the method of the present embodiment, the clogging of the pathway for removing the transferring medium does not occur and problems such as degassing does not occur. As a result, the sintered magnet of comparatively thin type can be produced with a high productivity.

Further, in the method of the present embodiment, by dispersing the magnetic powder obtained as the final results of the pulverizing steps in the solvent for the wet-pulverizing, the powder particle aggregation loosens and the solvent intervenes between the particles. In this condition, by adhering to the surface active agent to the magnetic powder, even if the magnetic powder after drying reaggregates, the surface active agent is sandwiched between the magnetic powder particles. Therefore, the reaggregated granulate (the aggregation of the magnetic powder particles) tends to degarade to the magnetic powder particles in the later steps (kneading/forming).

Further, the method of the present embodiment is effective to produce the sintered magnet of a particularly thin type. For producing the thin type sintered magnet, a thin type preform body may be produced, when the preform body becomes a thin type, debinding treatment becomes easier and the shape of the formed body can be variously changed.

Note that, the present invention is not limited to the above mentioned embodiment, and may be modified within a range of the present invention.

EXAMPLES

Below, the present invention will be further explained by examples.

Example 1

The object composition was $La_{0.4}Ca_{0.2}Sr_{0.4}Co_{0.3}Fe_{11.3}O_{19}$, and followings were used as starting materials. $Fe_2O_3$ powder (including Mn, Cr, Si, Cl as impurities), $SrCO_3$ powder (including Ba, Ca as impurities), $La(OH)_3$ powder, $CaCO_3$ powder, $Co_3O_4$ powder were prepared so as to be the object composition. The above mentioned starting materials and additives were pulverized by a wet attritor, dryed and granulated, and fired at 1230° C. for 3 hours in atmosphere, to obtain the granulated calcine body.

This calcined body was dry pulverized by an oscillating mill. Next, using water as a dispersing medium and sorbitol as dispersing agent, after adding 0.5 parts by weight of sorbitol, 0.6 parts by weight of $SiO_2$, 1.4 parts by weight of $CaCO_3$ with respect to 100 parts by weight of the calcined body particle, these and the above mentioned calcined body particles are blended to prepare slurry for pulverizing. By using this slurry for the pulverizing, wet-pulverizing was conducted for 40 hours. A specific surface area after the wet-pulverizing was 8.5 m$^2$/g (the average particle diameter 0.5 μm).

After the wet-pulverizing, the calcined particle (the magnetic powder) was dried at 100° C. for 10 hours. When the average particle diameter of the calcined body particle after drying was inspected by SEM, it was 0.3 μm.

The magnetic powder after drying was kneaded by a kneader with the binder resin, waxes, lubricant, plasticizer, sublimable compounds and the like, to form pellets by a pelletizer and the like. The kneading was performed under the condition at 150° C. for 2 hours.

POM (polyacetal) was used as the binder resin, paraffin wax was used as waxes, fatty acid ester was used as the lubricant, and phthalate ester was used as the plasticizer.

The added amount of the binder resin was 7.5 parts by weight with respect to 100 parts by weight of the magnetic powder, the added amount of the waxes was 7.5 parts by weight, and the added amount of the lubricant was preferably 0.5 parts by weight. The added amount of the plasticizer was preferably 1 to 5 parts by weight with respect to 100 parts by weight of the binder resin.

Figure 3:
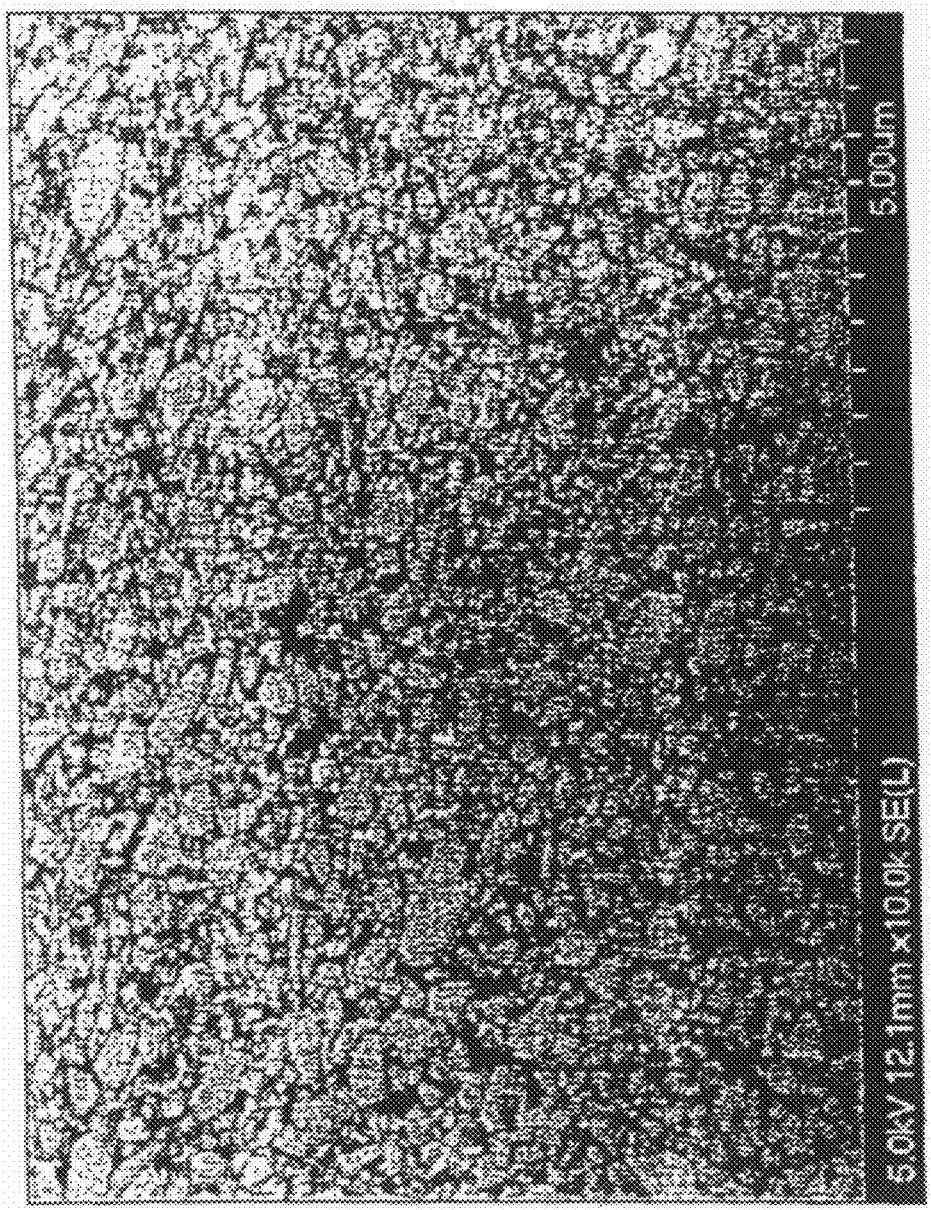
FIG. 3 is a cross sectional SEM picture of pellets prior to magnetic field injection molding.

The pellet of the present embodiment which includes at least the magnetic powder and the binder resin was cut, and when the SEM picture of a cut surface thereof was observed, it was confirmed that the magnetic powder was dispersed uniformly in a matrix of the binder resin. The SEM picture of across section of the pellet prior to the magnetic field injection molding obtained by the method of the present embodiment is shown in FIG. 3. The white contrast portion shown in FIG. 3 is magnetic powder and uniform dispersion has been confirmed.

Next, the pellets 10 were injection molded into the mold 8 by using the magnetic field injection molding apparatus 2 shown in FIG. 1. Prior to the injection to the mold 8, the mold 8 was closed to form the cavity 12, and the magnetic field was applied to the mold 8. Note that, the pellets 10 were heated and melted in the extruder 6, for example at 160° C., and were injected into the cavity 12 of the mold 8 by a screw. The temperature of the mold 8 was 40° C. A thickness of the preform body was 2 mm and an arc shape flat plate was formed.

A magnetic orientation degree (Ir/Is) of the formed body is effected by density of the formed body, thus an accurate estimation cannot be made. Therefore, the flat shape molding face was measured by X-ray diffraction, and a crystallographic orientation degree (X-ray orientation) of the formed body was estimated from a peak plane index and a strength which appeared.

The X-ray orientation degree of the formed body occupies considerable degree of the value of the magnetic orientation degree of the sintered body. Note that, in the present specification, $\Sigma I(00L)/\Sigma I(hkL)$ was used as the X-ray orientation degree. The (00L) is an indication of generic term of c-face of (004), (006) and the like, and, $\Sigma I(00L)$ is a total sum of the whole peak strength of (00L) face. Also, the (hkL) shows all of the detected peaks, and $\Sigma I(hkL)$ is a total sum of these strengths. Thus, $\Sigma I(00L)/\Sigma I(hkL)$ shows degree of the c-face orientation. The $\Sigma I(00L)/\Sigma I(hkL)$ of the present embodiment was 0.58.

Next, the preform body after the magnetic field injection molding was heat treated at temperature of 500° C. in atmosphere for 48 hours to conduct debinding treatment. Next, in the sintering step, a formed body was sintered for example, in atmosphere, preferably at a temperature of 1160° C. for 0.4 hours to obtain anisotropic ferrite magnet.

A remnant magnetic flux density Br, a coercitivity HcJ, an orientation degree Ir/Is, a squareness ratio Hk/HcJ and a sintered density of the obtained sintered ferrite magnet were measured. Note that, Hk is an external magnetic field strength when a magnetic flux density becomes 90% of the remnant magnetic flux density at second quadrant of the magnetic hysteresis loop. When Hk is low, high energy product cannot be obtained. The Hk/HcJ becomes an index of the magnetic performance, and shows an square degree of the magnetic hysteresis loop at the second quadrant.

The remnant magnetic flux density Br of the obtained sintered ferrite magnet was 4600 G, the coercitivity HcJ was 4900 Oe, the orientation degree Ir/Is was 97.2%, the squareness ratio Hk/HcJ was 93.3% and the a sintered density was 5.1 g/cm$^3$.

Example 2

Other than using mannitol instead of sorbitol as the surface active agent, the preform body was formed and the sintered ferrite magnet was produced as similar to Example 1. X-ray orientation degree $\Sigma I(00L)/\Sigma I(hkL)$ of the obtained preform body was 0.57.

The remnant magnetic flux density Br of the obtained sintered ferrite magnet was 4590 G, the coercitivity HcJ was 4900 Oe, the orientation degree Ir/Is was 97.1%, the squareness ratio Hk/HcJ was 92.8% and the sintered density was 5.1 g/cm$^3$.

Example 3

Except for changing the added amount of the surface active agent as shown in a following Table 1, the preform body was formed and the sintered ferrite magnet was produced as similar to Example 1.

X-ray orientation degree $\Sigma I(00L)/\Sigma I(hkL)$ of the obtained sintered ferrite magnet, the remnant magnetic flux density Br, the coercitivity HcJ, the orientation Ir/Is, the squareness ratio Hk/HcJ, the sintered density, the ratio of the crack occurrence are shown in Table 1.

As shown in Table 1, it has been confirmed that few cracks and the magnetic property were improved by adding 0.03 to 5 parts by weight, preferably 0.03 to 3 parts by weight of the surface active agent with respect to 100 parts by weight of magnetic powder. Note that, the ratio of the crack occurrence was calculated by preparing five samples produced under the same condition, and dividing the whole sample number with the samples that crack visually observed.

TABLE 1

| Sample No. | Dispersing agent type | Added amount parts by weight | Formed body X ray orientation degree $\Sigma I(00L)/\Sigma I(hkL)$ | Sintered body | | | | | |
|---|---|---|---|---|---|---|---|---|---|
| | | | | Remenant magnetic flux density Br G | Coercityvity HcJ Oe | Orientation degree Ir/Is | Squareness ratio Hk/HcJ | Sintering density g/cm$^2$ | Ratio of the occurrence of the crack |
| 1 | solbitol | 0 | 0.46 | 4450 | 4890 | 95.3 | 91 | 5.1 | 1/5 |
| 2 | solbitol | 0.03 | 0.49 | 4480 | 4900 | 95.4 | 90.9 | 5.1 | 1/5 |
| 3 | solbitol | 0.05 | 0.5 | 4480 | 4900 | 95.6 | 91.6 | 5.1 | 2/5 |
| 4 | solbitol | 0.1 | 0.51 | 4500 | 4880 | 95.9 | 91.6 | 5.1 | 1/5 |

TABLE 1-continued

| Sample No. | Dispersing agent type | Added amount parts by weight | Formed body X ray orientation degree ΣI(OOL)/ΣI(hkL) | Sintered body | | | | | |
|---|---|---|---|---|---|---|---|---|---|
| | | | | Remenant magnetic flux density Br G | Coercityvity HcJ Oe | Orientation degree Ir/Is | Squareness ratio Hk/HcJ | Sintering density g/cm$^2$ | Ratio of the occurrence of the crack |
| 5 | solbitol | 0.3 | 0.56 | 4580 | 4910 | 96.9 | 92 | 5.1 | 0/5 |
| 6 | solbitol | 0.5 | 0.58 | 4600 | 4900 | 97.2 | 93 | 5.1 | 0/5 |
| 7 | solbitol | 1 | 0.58 | 4610 | 4900 | 97.3 | 93.1 | 5.1 | 1/5 |
| 8 | solbitol | 3 | 0.62 | 4620 | 4910 | 97.5 | 93.1 | 5.1 | 2/5 |
| 9 | solbitol | 5 | 0.63 | 4630 | 4890 | 97.6 | 92.9 | 5.1 | 4/5 |
| 10 | solbitol | 6 | 0.64 | 4630 | 4900 | 97.6 | 92.9 | 5.1 | 5/5 |

The invention claimed is:

1. A method for producing a sintered magnet comprising steps of;
    wet-pulverizing a magnetic powder under a presence of a surface active agent,
    drying said wet-pulverized magnetic powder for obtaining the magnetic powder to which said surface active agent adheres,
    heating and kneading said dried magnetic powder with a binder resin to form a pellet,
    melting said pellet and obtaining a preform body by said melted pellet within a mold applied with a magnetic field, and
    firing said preform body.

2. The method for producing the sintered magnet as set forth in claim 1, wherein;
    said magnetic powder is a ferrite powder having average particle diameter within a range of 0.03 to 0.7 μm.

3. The method for producing the sintered magnet as set forth in claim 1, wherein;
    said surface active agent comprises at least one of sorbitol and mannitol.

4. The method for producing the sintered magnet as set forth in claim 1, wherein;
    0.05 to 5 parts by weight of said surface active agent is included in 100 parts by weight of said magnetic powder.

5. The method for producing the sintered magnet as set forth in claim 1, wherein;
    in case there is a plurality of steps of wet-pulverizing said magnetic powder, said magnetic powder is wet-pulverized under the presence of said surface active agent, in a final wet-milling step.

6. The method for producing the sintered magnet as set forth in claim 1, further comprising a step of;
    dry rough pulverizing said magnetic powder prior to the step of wet-pulverizing, wherein;
    said surface active agent is added at the step of dry rough pulverizing.

7. The method for producing the sintered magnet as set forth in claim 2, wherein;
    said surface active agent comprises at least one of sorbitol and mannitol.

8. The method for producing the sintered magnet as set forth in claim 2, wherein;
    0.05 to 5 parts by weight of said surface active agent is included in 100 parts by weight of said magnetic powder.

9. The method for producing the sintered magnet as set forth in claim 2, wherein;
    in case there is a plurality of steps of wet-pulverizing said magnetic powder, said magnetic powder is wet-pulverized under the presence of said surface active agent, in a final wet-milling step.

10. The method for producing the sintered magnet as set forth in claim 2, further comprising a step of;
    dry rough pulverizing said magnetic powder prior to the step of wet-pulverizing, wherein;
    said surface active agent is added at the step of dry rough pulverizing.

* * * * *